United States Patent
Hertschuh et al.

(10) Patent No.: US 10,296,953 B2
(45) Date of Patent: *May 21, 2019

(54) ASSISTED SHOPPING

(71) Applicant: Amazon Technologies, Inc., Seattle, WA (US)

(72) Inventors: Fabien G. Hertschuh, Seattle, WA (US); Benoit St-Pierre, Seattle, WA (US); James L. Ford, Bellevue, WA (US); Sean P. Cier, Seattle, WA (US); Samuel P. Hall, VI, Seattle, WA (US); Peter C. Wong, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/237,569

(22) Filed: Aug. 15, 2016

(65) Prior Publication Data

US 2016/0350825 A1    Dec. 1, 2016

Related U.S. Application Data

(63) Continuation of application No. 14/494,015, filed on Sep. 23, 2014, now Pat. No. 9,454,779, which is a continuation of application No. 13/171,761, filed on Jun. 29, 2011, now Pat. No. 8,849,791.

(51) Int. Cl.
*G06Q 30/06*    (2012.01)

(52) U.S. Cl.
CPC ..... *G06Q 30/0617* (2013.01); *G06Q 30/0613* (2013.01); *G06Q 30/0623* (2013.01); *G06Q 30/0637* (2013.01); *G06Q 30/0641* (2013.01)

(58) Field of Classification Search
CPC ......... G06F 17/30463; G06F 17/30864; G06F 17/30867; G06F 17/30442; G06F 17/30595
USPC ........................................................ 707/713
See application file for complete search history.

(56) References Cited

U.S. PATENT DOCUMENTS

| | | |
|---|---|---|
| 5,897,622 A | 4/1999 | Blinn et al. |
| 6,196,846 B1 | 3/2001 | Berger et al. |
| 6,295,551 B1 | 9/2001 | Roberts et al. |
| 6,345,239 B1 | 2/2002 | Bowman-Amuah |
| 6,771,766 B1 | 8/2004 | Shafiee et al. |
| 6,928,417 B1 | 8/2005 | Sundaresan |

(Continued)

FOREIGN PATENT DOCUMENTS

JP    8095734    4/1996

OTHER PUBLICATIONS

U.S. Appl. No. 14/494,015, filed Sep. 23, 2014, Notice of Allowance dated May 31, 2016.

(Continued)

*Primary Examiner* — Michael Pham
(74) *Attorney, Agent, or Firm* — Thomas Horstemeyer, LLP

(57) ABSTRACT

Disclosed are various embodiments for facilitating an assisted shopping experience. A speech input can be captured and transcribed. The transcribed speech input can be transmitted to a customer service agent in a data session that is contemporaneous with a voice session. The customer service agent can then facilitate an assisted shopping experience via the voice session and data session.

20 Claims, 8 Drawing Sheets

(56) References Cited

U.S. PATENT DOCUMENTS

| | | | |
|---|---|---|---|
| 6,941,273 B1* | 9/2005 | Loghmani | G06Q 30/06 379/90.01 |
| 7,103,550 B2 | 9/2006 | Gallagher et al. | |
| 7,454,368 B2 | 11/2008 | Stillman | |
| 7,512,098 B2 | 3/2009 | Jiang et al. | |
| 7,536,323 B2* | 5/2009 | Hsieh | G06Q 30/02 705/26.62 |
| 7,672,931 B2 | 3/2010 | Hurst-Hiller et al. | |
| 7,725,307 B2* | 5/2010 | Bennett | G06F 17/27 704/238 |
| 7,780,081 B1 | 8/2010 | Liang | |
| 7,801,570 B2 | 9/2010 | Cheung et al. | |
| 8,095,734 B2 | 1/2012 | Lippert et al. | |
| 8,099,289 B2 | 1/2012 | Mozer et al. | |
| 8,353,452 B2 | 1/2013 | Sharpe et al. | |
| 8,630,851 B1 | 1/2014 | Hertschuh et al. | |
| 8,719,031 B2 | 5/2014 | Gibbon et al. | |
| 9,069,843 B2 | 6/2015 | Chitiveli et al. | |
| 2002/0059378 A1 | 5/2002 | Mustafa | |
| 2002/0072974 A1* | 6/2002 | Pugliese, III | G06Q 30/02 705/14.16 |
| 2002/0120674 A1 | 8/2002 | Son et al. | |
| 2002/0143550 A1* | 10/2002 | Nakatsuyama | G06Q 30/06 704/270.1 |
| 2003/0115191 A1 | 6/2003 | Copperman et al. | |
| 2006/0026206 A1 | 2/2006 | Loghmani et al. | |
| 2006/0122976 A1 | 6/2006 | Baluja et al. | |
| 2007/0282703 A1* | 12/2007 | Sharpe | G06Q 30/0601 705/26.1 |
| 2008/0222140 A1 | 9/2008 | Lagad et al. | |
| 2009/0006336 A1 | 1/2009 | Forstall et al. | |
| 2009/0012418 A1 | 1/2009 | Gerlach | |
| 2009/0012704 A1 | 1/2009 | Franco et al. | |
| 2009/0262200 A1 | 10/2009 | Takabatake et al. | |
| 2009/0262741 A1 | 10/2009 | Jungck et al. | |
| 2009/0287680 A1 | 11/2009 | Paek et al. | |
| 2009/0304161 A1 | 12/2009 | Kamalizad et al. | |
| 2010/0061534 A1 | 3/2010 | Wang et al. | |
| 2010/0114822 A1* | 5/2010 | Pollock | H04L 67/36 707/623 |
| 2010/0153204 A1 | 6/2010 | Shaw et al. | |
| 2010/0179955 A1 | 7/2010 | Wu et al. | |
| 2010/0203770 A1 | 8/2010 | Hirai | |
| 2011/0022468 A1 | 1/2011 | Muster et al. | |
| 2011/0040666 A1 | 2/2011 | Crabtree et al. | |
| 2011/0106527 A1 | 5/2011 | Chiu | |
| 2011/0246330 A1 | 10/2011 | Tikku et al. | |
| 2012/0078700 A1 | 3/2012 | Pugliese, III et al. | |
| 2012/0203770 A1 | 8/2012 | Chitiveli et al. | |
| 2012/0235865 A1 | 9/2012 | Nath et al. | |
| 2012/0310926 A1 | 12/2012 | Gannu et al. | |

OTHER PUBLICATIONS

U.S. Appl. No. 14/494,015, filed Sep. 23, 2014, Response to Non-Final Office Action dated Jan. 22, 2016.

U.S. Appl. No. 14/494,015, filed Sep. 23, 2014, Non-Final Office Action dated Jan. 22, 2016.

U.S. Appl. No. 13/171,761, filed Jun. 29, 2011, Notice of Allowance dated May 9, 2014.

U.S. Appl. No. 13/171,761, filed Jun. 29, 2011, Response to Non-Final Office Action dated Dec. 20, 2013.

U.S. Appl. No. 13/171,761, filed Jun. 29, 2011, Non-Final Office Action dated Dec. 20, 2013.

U.S. Appl. No. 13/171,761, filed Jun. 29, 2011, Response to Final Office Action dated Jul. 18, 2013.

U.S. Appl. No. 13/171,761, filed Jun. 29, 2011, Final Office Action dated Jul. 18, 2013.

U.S. Appl. No. 13/171,761, filed Jun. 29, 2011, Response to Non-Final Office Action dated Dec. 6, 2012.

U.S. Appl. No. 13/171,761, filed Jun. 29, 2011, Non-Final Office Action dated Dec. 6, 2012.

U.S. Appl. No. 14/138,925, filed Dec. 23, 2013, Notice of Allowance dated Dec. 8, 2014.

U.S. Appl. No. 14/138,925, filed Dec. 23, 2013, Response to Non-Final Office Action dated Jul. 16, 2014.

U.S. Appl. No. 14/138,925, filed Dec. 23, 2013, Non-Final Office Action dated Jul. 16, 2014.

U.S. Appl. No. 13/171,752, filed Jun. 29, 2011, Notice of Allowance dated Sep. 5, 2013.

U.S. Appl. No. 13/171,752, filed Jun. 29, 2011, Response to Non-Final Office Action dated Feb. 11, 2013.

U.S. Appl. No. 13/171,752, filed Jun. 29, 2011, Non-Final Office Action dated Feb. 11, 2013.

* cited by examiner

ASSISTED SHOPPING

CROSS-REFERENCE TO RELATED APPLICATIONS

This application is a continuation of and claims the benefit of U.S. patent application Ser. No. 14/494,015, entitled "ASSISTED SHOPPING," which is a continuation of and claims the benefit of U.S. patent application Ser. No. 13/171,761, entitled "ASSISTED SHOPPING," and filed Jun. 29, 2011, which are hereby incorporated by reference in their entirety.

BACKGROUND

Users can communicate with an electronic commerce site via a mobile device. In some cases, users may wish to browse, search for and/or purchase products via a mobile device. Interacting with a browser and/or a mobile application user interface can often require input into a keyboard, touchscreen or other tactile input device that requires the attention of the user to submit search terms, select products, enter payment information, or other information needed to browse and/or purchase products from a mobile device.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

In the following discussion, a general description of the system and its components is provided, followed by a discussion of the operation of the same. Embodiments of the present disclosure are directed to systems and methods that facilitate an assisted shopping experience for users of an electronic commerce site. A mobile application or an application executed on a client can utilize various input devices and other hardware capabilities to enhance a user's experience as well as facilitate a shopping experience that can be assisted by a customer service agent as described herein.

Figure 1:
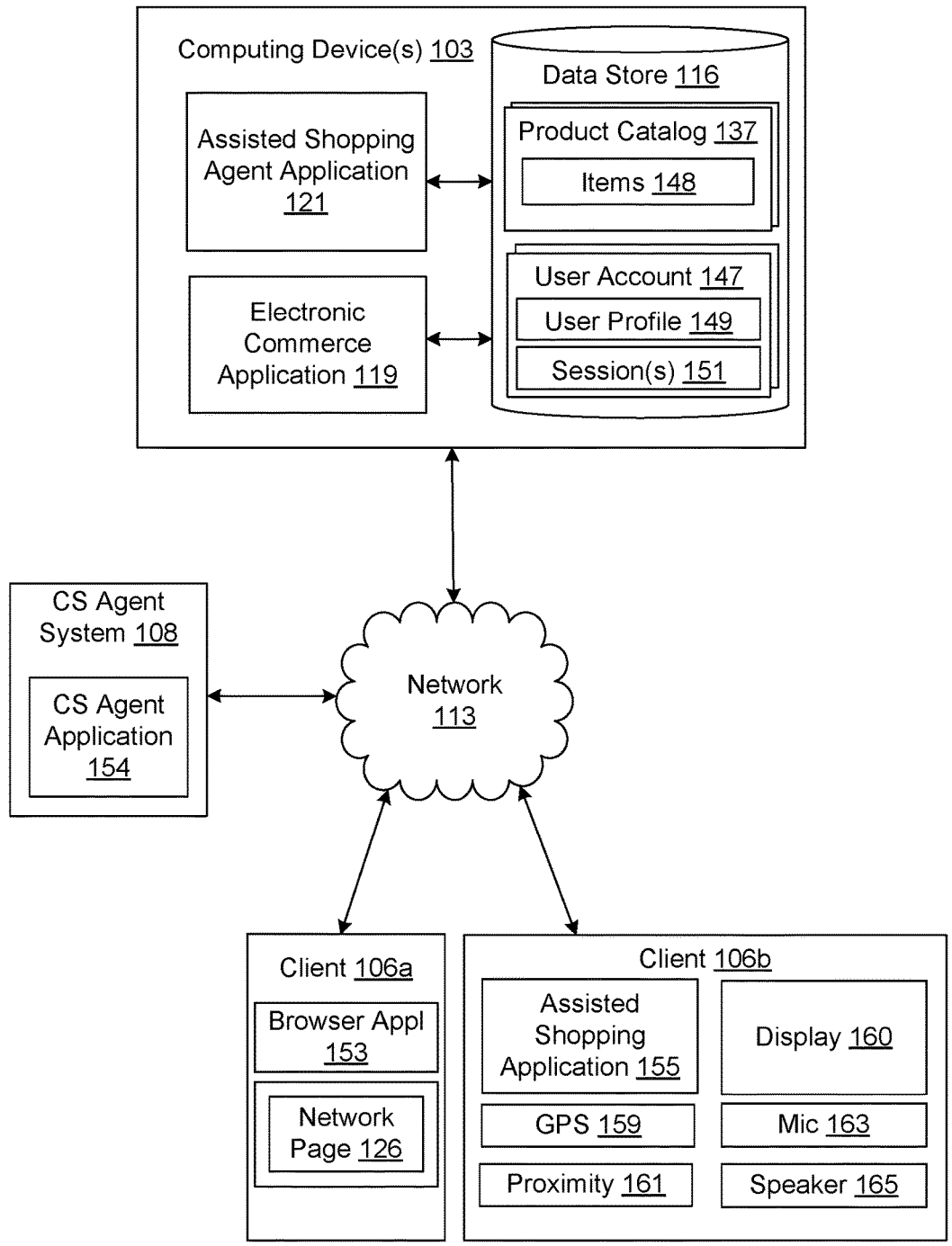
FIG. 1 is a drawing of a networked environment according to various embodiments of the present disclosure.

With reference to FIG. 1, shown is a networked environment 100 according to various embodiments. The networked environment 100 includes at least one computing device 103 in communication with at least one client device 106 and at least one customer service (CS) agent system 108. The network 113 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise, for example, a cloud computing resource, a grid computing resource, and/or any other distributed computing arrangement. Such computing devices 103 may be located in a single installation or may be dispersed among many different geographical locations. As one example, each of the disclosed components executed in the computing device 103 can be executed in different computing devices 103 in various locations in one or more data centers. However, for purposes of convenience, the computing device 103 is referred to herein in the singular. Even though the computing device is referred to in the singular, it is understood that a plurality of computing devices 103 may be employed in the various arrangements as described above.

The components executed on the computing device 103 include, for example, an electronic commerce application 119, an assisted shopping agent application 121, and other systems, applications, services, processes, engines, or functionality not discussed in detail herein. The electronic commerce application 119 is executed in order to facilitate the online purchase of items from one or more electronic marketplaces over the network 113. The electronic commerce application 119 also performs various backend functions associated with the online presence of an electronic marketplace in order to facilitate the online purchase of items. For example, the electronic commerce application 119 generates network pages such as, for example, web pages and/or other types of network content that are provided to clients for the purposes of promoting and selecting items for purchase, rental, download, lease, or any other forms of consumption.

The assisted shopping agent application 121 is executed to facilitate an assisted shopping experience that allows users and CS agents associated with an electronic commerce site to communicate with one another as described herein. The assisted shopping agent application 121 allows a CS agent to view various information about data displayed on a client device associated with a user, push information about products, facilitate purchasing of products via the electronic commerce application 119 as well as communicate via a voice session (e.g., telephone call, voice over internet protocol session, etc.). The assisted shopping agent application 121 can also receive search terms and other text that is derived from voice commands transcribed by a mobile application on a client to facilitate the assisted shopping experience described herein. In some embodiments, the assisted shopping agent application 121 can also receive a representation of voice commands, such as an audio file or other digital representation of an audio sample, from a client device 106 and generate a text equivalent to exchange data between a client 106 and the assisted shopping agent application 121. The assisted shopping agent application 121 can also receive data from a mobile application, special purpose application, and/or a browser via a data session, and the assisted shopping agent application 121 can also serve content to a client device 106 as described herein.

With regard to the data store 116, the data stored therein can include, for example, a product catalog 137, user account data 147, and potentially other data. The product catalog 137 may include information related to a plurality of items 148 offered in an electronic marketplace or otherwise available via the electronic commerce application 119. An item 148 may refer to a product, good, service, software download, multimedia download, social networking profile, or any combination, bundle, or package thereof, that may be offered for sale, purchase, rental, lease, download, and/or any other form of consumption as may be appreciated. The various data stored in the product catalog 137 may include, for example, search terms, titles, descriptions, quantities, conditions, images, options, weights, customer reviews, customer ratings, keywords, shipping restrictions, prices, tax classifications, unique identifiers, and any other data related to items 148.

The data store 116 can also include data regarding the various user accounts 147 of an electronic commerce site facilitated by the electronic commerce application 119 and assisted shopping agent application 121. In some embodiments, each user account 147 can be associated with a user profile 149 that can contain demographic data about the user as well as information regarding the browsing activity, purchase history, interests, or any other profile data about the user. User accounts 147 can also include session data 151 that includes information about assisted shopping sessions initiated by the user with a CS agent. The session data 151 can include search histories, browse histories, and CS agent notes, and other data related to the user's interactions with the assisted shopping agent application 121 via a client device 106.

The data store 116 can also include other data related to users and products as can be appreciated, but which are not necessary to discuss herein for an understanding of the various embodiments of the disclosure. Additionally, it should be appreciated that the data store 116 can be implemented in a separate computing device that may be located in a separate installation or location. The depicted table structure of the data store 116 is one example of how data can be structured therein according to embodiments of this disclosure, as it should be appreciated that data can be structured in many different ways across multiple data stores implemented in various computing devices. Accordingly, it should be appreciated that the depicted data store 116 and the table structure shown therein is but one example given for ease of depiction and explanation of various embodiments of this disclosure.

The client device 106 is representative of a plurality of client devices 106 that may be coupled to the network 113. The client device 106 may comprise, for example, a processor-based system such as a computer system. Such a computer system may be embodied in the form of a desktop computer, a laptop computer, a personal digital assistant, a mobile device (e.g., cellular telephone, smart phone, etc.), set-top box, music players, web pads, tablet computer systems, or other devices with like capability. The client device 106 includes a display device 152 upon which content pages 126 and other content may be rendered.

A client device 106a may be configured to execute various applications such as a browser application 153 and/or other applications. The browser application 153 may be executed in a client device 106, for example, to access and render content pages 126, such as web pages, or other network content served up by the computing device 103, CS agent system 108 and/or other servers. The client device 106a may be configured to execute applications beyond a browser application 153 such as, for example, instant message applications, an application specifically tailored to access resources of the computing device 103, and/or other applications as can be appreciated.

Another example of a device that can interact with the assisted shopping agent application 121 includes a client device 106b that can include a mobile device, tablet system, or like system that executes an assisted shopping application 155 that can receive inputs from a user, interact with the hardware and other capabilities of the client 106b as well as exchange data with the assisted shopping agent application 121. The assisted shopping application 155 is also tailored to access data provided by the assisted shopping agent application 121 and/or the CS agent application 154 and can include client side code that generates a user interface on a display device of the client 106b. The client device 106b may comprise a mobile device including cellular telephone and data access, location detection hardware, speed and/or direction detection hardware, and/or other hardware and software components.

Such a device can detect the location of a user using global positioning system 159 (GPS) or other location detection functionality, which can be submitted by the assisted shopping application 155 to the assisted shopping agent application 121 and/or the CS agent application 154. In one example, global positioning system 159 (GPS) functionality provided by the client device 106b can provide a location of the client to the assisted shopping application 155, which can in turn transmit a location of the client to the assisted shopping agent application 121. In one embodiment, the assisted shopping agent application 121 can utilize location based services and applications executed on the client device 106b to determine a location of the user, which can be used to facilitate an assisted shopping experience. Additionally, such a device may also detect the speed and/or direction of a user or the device, which can be submitted by the assisted shopping application 155 to the assisted shopping agent application 121 and/or the CS agent application 154.

The assisted shopping application 155 can also control one or more displays 160 in communication with the client device 106. Additionally, the client device 106b can include other hardware devices that are within or accessible to the client device 106. In one embodiment, the assisted shopping application 155 receives data from a proximity sensor 161 and use the data to determine whether a client device 106 is near or against the user's ear. Accordingly, this data can be transmitted to the assisted shopping agent application 121 and/or CS agent application 154 so that a CS agent can determine whether the user is likely looking at the display 160 of the client device 106. Additionally, assisted shopping application 155 can also interact with a microphone 163 to receive audio inputs from a user as well as one or more speakers 165 to play audio content. The assisted shopping application 155 can also activate a speakerphone mode associated with the client device 106 as well as keep the display 160 of the device active. In one embodiment, a speakerphone mode that include setting a speaker level and/or microphone sensitivity above one or more thresholds. The assisted shopping application 155 can interact with any other hardware or software components associated with a client device 106b to facilitate the functionality of embodiments of the present disclosure.

The CS agent system 108 is representative of one or more computing systems that can execute a CS agent application 154 with which a CS agent can interact with a user on a client 106 in an assisted shopping session. In some embodiments, the CS agent application 154 can include a browser that renders content provided by assisted shopping agent application 121 and/or client 106. In other embodiments, the CS agent application 154 can include a special purpose application that facilitates communication with the client 106. In some embodiments, some or all of the functionality described herein as ascribed to the assisted shopping agent application 121 can be implemented in a CS agent system 108.

Next, a description of various embodiments, variations, and examples of the present disclosure are provided. The following discussion includes non-limiting examples of interactions of users and CS agents in an assisted shopping experience that is facilitated by embodiments of the disclosure. Users of an electronic commerce site can engage in an assisted shopping experience to browse, search and/or purchase products available via an electronic commerce application 119. Such an experience can be facilitated by interactions with a CS agent associated with the electronic commerce site. In one embodiment, a user can initiate an assisted shopping experience by invoking the assisted shopping application 155 in a client. In one embodiment, the assisted shopping application 155 can prompt the user to speak about what the user is seeking via an electronic commerce site. The assisted shopping application 155 can transcribe the speech captured via a microphone 163 by employing a speech recognition or speech transcription algorithm, which can be transmitted to the assisted shopping agent application 121. In this way, the assisted shopping application 155 can establish a data session, such as a hypertext transport protocol session, with the assisted shopping agent application 121 that allows the exchange of data between the application and the assisted shopping agent application 121.

The assisted shopping application 155 can also initiate a voice session that is contemporaneous with a CS agent that allows a user to speak to the CS agent via the assisted shopping application 155. Such a voice session can be a bidirectional voice session that can be routed through the assisted shopping agent application 121 and/or the CS agent application 154 and allow a conversation between the user and the CS agent. In some embodiments, the voice session can include a wired and/or wireless phone call according to various standards that are known in the art. Additionally, in some embodiments, a wireless communication standard implemented by the client device 106 may not allow simultaneous or contemporaneous voice and data transmission. Additionally, in other embodiments, the assisted shopping application 155 may be executed on a client device 106 that is only equipped with the ability to communicate via the Internet. Therefore, in these scenarios, the assisted shopping application 155 can initiate a VoIP session with the assisted shopping agent application 121 to communicate with the CS agent so that the voice session and data session can be contemporaneous.

Accordingly, the assisted shopping agent application 121 can initiate a search of the product catalog 137 for products that are relevant to the transcribed speech and transmit search results to the assisted shopping application 155, which can be rendered on the client device 106 in a user interface. The assisted shopping application 155 can render a search results user interface that presents one or more search results relevant to the transcribed speech. As a voice session is established with the assisted shopping agent application 121 contemporaneously with the data session, a CS agent can speak to the user and provide assistance with searching for products as well as completing purchases. To facilitate this assisted shopping experience, the assisted shopping agent application 121 can push data to the assisted shopping application 155, which can display data pushed by the CS agent on the client device 106. Accordingly, the following user interfaces illustrate various examples of interactions that can occur between the assisted shopping agent application 121 and the assisted shopping application 155 that allow an assisted shopping experience to take place between a user and CS agent.

Figure 2:
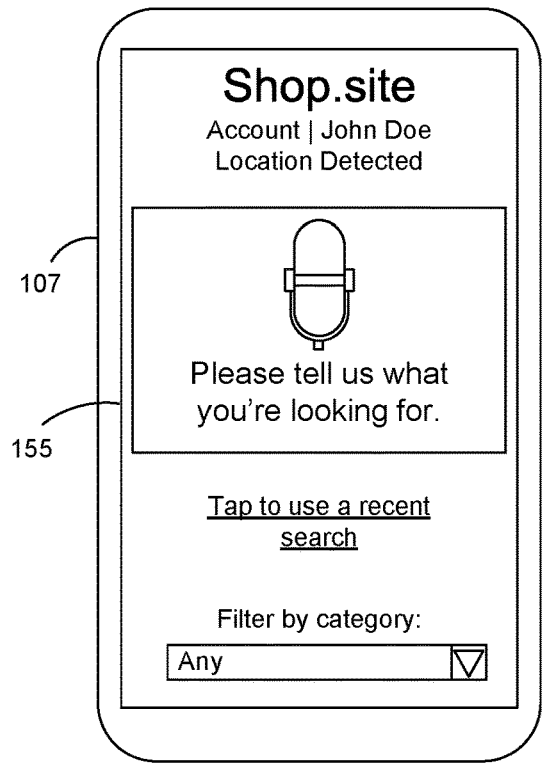
FIGS. 2-7 are drawings of examples of user interfaces rendered by a client in the networked environment of FIG. 1 according to various embodiments of the present disclosure.

Therefore, reference is made to FIG. 2, in which an example user interface rendered by the assisted shopping application 155. The depicted user interface illustrates an example of an initial screen that can be presented to a user upon invocation of the assisted shopping application 155. In the depicted example, the assisted shopping application 155 can prompt the user to speak one or more search terms related to products the user is seeking, which can initiate an assisted shopping experience. The assisted shopping application 155 can also allow the user to filter or limit the assisted shopping experience by product category, brand, location, or other attributes. In some embodiments, the assisted shopping application 155 can allow the user to access previous assisted shopping sessions and initiate a new session based upon a previous one.

Figure 3:
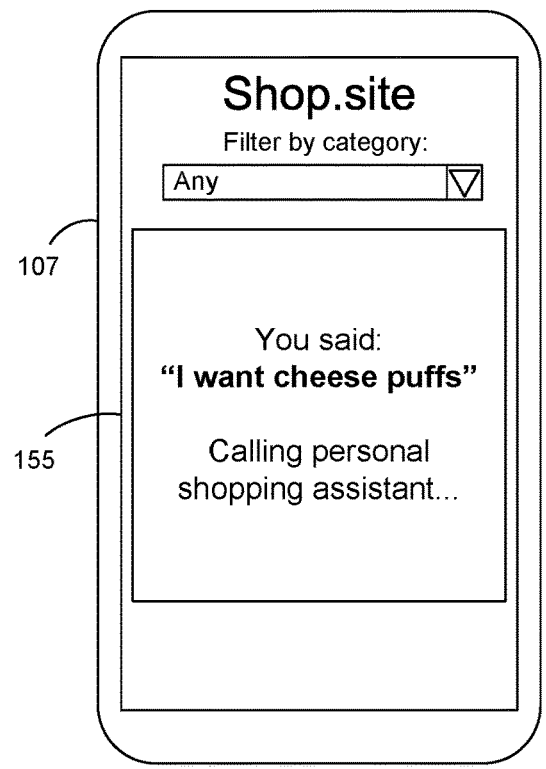

Continuing the example shown in FIG. 2, reference is now made to FIG. 3, which illustrates an example user interface that can be rendered on the client device 106 after a user speaks into a client device 106 microphone. In the depicted example, the assisted shopping application 155 can perform a voice capture as well as transcribe the speech input. In some embodiments, the assisted shopping application 155 can transcribe the speech input by employing a speech recognition algorithm. In other embodiments, the assisted shopping application 155 can transmit a representation of the speech input to the assisted shopping agent application 121 or a speech recognition service via the network 113, which can transcribe the speech input on behalf of the assisted shopping application 155. The assisted shopping application 155 can also initiate a voice session with a CS agent, who can facilitate an assisted shopping experience on behalf of the user.

The assisted shopping agent application 121 can receive the speech input and/or a text input corresponding to the transcribed speech input and perform a search for relevant products in the product catalog 137 associated with an electronic commerce site. The assisted shopping agent application 121 can transmit corresponding search results via the data session to the assisted shopping application 155. In some embodiments, the assisted shopping application 155 can remove certain terms from the transcribed speech input that can be considered extraneous or potentially unrelated to products in the product catalog 137. In one embodiment, the assisted shopping application 155 can consult a dictionary of extraneous terms and/or phrases that can be removed from a transcribed speech input before a text input is transmitted to the assisted shopping agent application 121 to perform a product search. In other embodiments, the assisted shopping agent application 121 can receive the transcribed speech input and remove extraneous terms from the text input that is employed to generate search results that are transmitted to the client device 106.

In one example, the assisted shopping agent application 121 can also consult a dictionary of extraneous terms and/or phrases that can be removed from the text input. In another example, the assisted shopping agent application 121 can identify terms in the text input that are unrelated to products in the product catalog 137 and remove these terms from the text input. As yet another example, the assisted shopping agent application 121 can identify terms in the text input that are related to fewer search results than a threshold and remove these terms from the text input. In some cases, the assisted shopping agent application 121 can identify terms in the text input that are related to more search terms than a threshold, which can indicate that these terms are not useful for identifying the intent of the user and remove these terms from the text input. For example, the assisted shopping agent application 121 can identify that the search term "the" is related to more search results than a threshold and determine that the search term is not useful for identifying products that the user is seeking.

Figure 4:
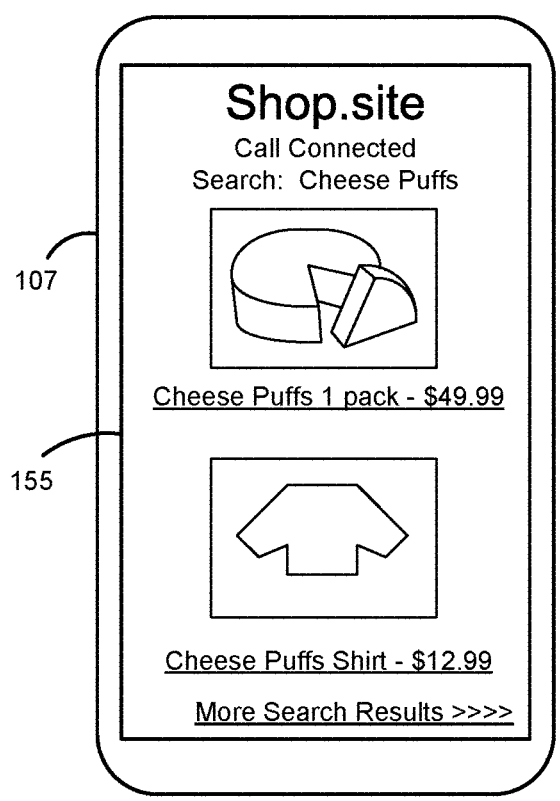

Continuing the example of FIG. 3, reference is now made to FIG. 4, which illustrates an example of a search results user interface that can be rendered by the assisted shopping application 155. The depicted user interface can contain search results that are related to the transcribed speech input provided by the user and transmitted to the assisted shopping application 155 by the assisted shopping agent application 121. As shown in the example of FIG. 4, the assisted shopping application 155 can maintain a voice session contemporaneously with the data session and allow the user to speak to a CS agent about products the user is seeking. In some embodiments, the assisted shopping application 155 can provide a visual cue and/or indicator regarding a voice quality within the voice session as well as connectivity within the data session.

Figure 5:
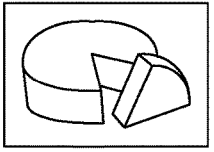

FIG. 5 illustrates an example of a user interface that can be rendered on a CS agent system 108 by the CS agent application 154 that can allow the CS agent to interact with the assisted shopping application 155 via the data session to receive and/or push data from the user during the assisted shopping experience. In the depicted example, the data session between the assisted shopping application 155 and assisted shopping agent application 121 can allow the assisted shopping application 155 to determine the content displayed by the assisted shopping application 155 at any given point in time. Additionally, the CS agent application 154 can display additional information about the user to assist the CS agent with facilitating an assisted shopping experience. In the depicted example, the assisted shopping application 115 can provide and the CS agent application 154 can display location data associated with the user, speed and/or direction data associated with the user, purchase history, search history, and other profile data that may assist a CS agent with helping a customer in an assisted shopping experience.

The CS agent application 154 can also allow the CS agent to refine search terms corresponding to the speech input and generate a new search for products in the product catalog 137. Accordingly, the CS agent can refine a search and push the search results to the assisted shopping application 155, which can render the search results for display on the client device 106. In one example, the CS agent can suggest refinement of a search query to the user and push the search results to the assisted shopping application 115 for display on the client device 106. In another example, the refined search query created by the CS agent can include none of the terms in the speech input captured by the assisted shopping application 155. For example, a user may, as an initial speech input, say that he or she is seeking gifts for a spouse. Accordingly, the refinement of the speech input into a search query that can be created by the CS agent may include none of the terms spoken by the user.

Figure 6:
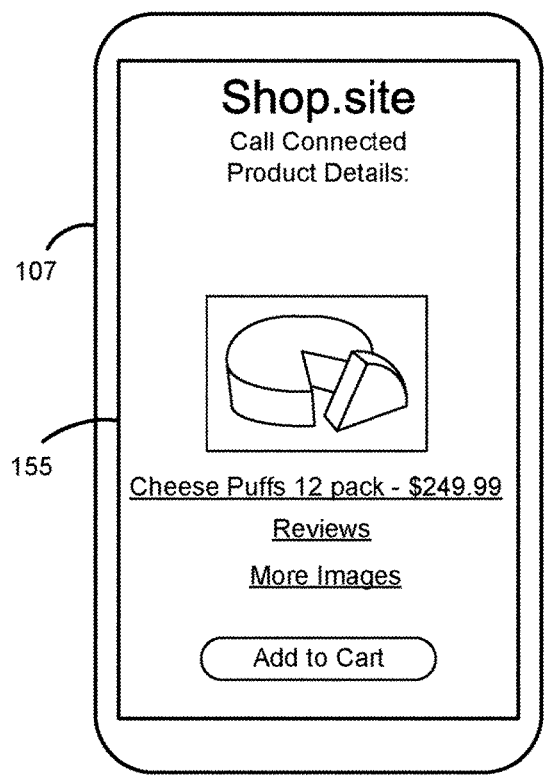

The CS agent application 154 can also allow the CS agent to push a product detail page containing pricing, shipping terms, and other information about specific products to the assisted shopping application 155, which can render the product detail page on the display of the client device 106. An example of such a scenario is illustrated in FIG. 6, where the CS agent application 154 can initiate a push of a product detail page to the assisted shopping application 155. In one example, CS agent can suggest certain products to the user via the voice session can push a product detail page to the assisted shopping application 155 for display on the client device 106.

Figure 7:
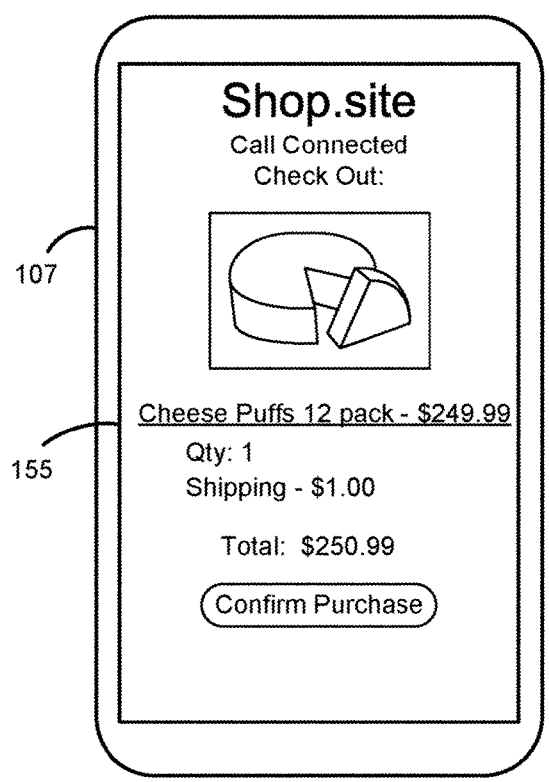

Returning to FIG. 5, the CS agent application 154 can also allow a CS agent to initiate purchase of a particular product. FIG. 7 illustrates an example of such functionality. In the depicted example, the CS agent can discuss potential products for purchase by the user and push a purchaser confirmation user interface to the assisted shopping application 155 for display on the mobile device 106. Accordingly, a purchase confirmation user interface can be transmitted to the assisted shopping application 155, where the user can confirm a purchase suggested by the CS agent. In some embodiments, the CS agent can, via the CS agent system, issue a command that causes the assisted shopping application 155 to purchase a product displayed by the application without any additional intervention or inputs by the user. In this scenario, the user can provide a verbal authorization to purchase a product to a CS agent via the voice session. Accordingly, the CS agent application 154 and/or assisted shopping agent application 121 can issue a command received by the client that causes the assisted shopping application 155 to confirm a purchase of a product. The assisted shopping application 155 can also initiate capture of a verbal authorization from the user to purchase a product, which can be archived by the assisted shopping agent application 121.

In some embodiments, a user can also capture imagery, video, audio, or other data with an input device in communication with the client 106, which can be transmitted to the assisted shopping agent application 121 can displayed by the CS agent application 154. Accordingly, the CS agent can view and/or listen to the captured data to facilitate the assisted shopping experience. As one example, the user can capture an image via the assisted shopping application 155, which can employ an image capture device associated with the client device 106. The assisted shopping application 155 can transmit the captured image to the assisted shopping agent application 121, and the CS agent can view the image and push search results, product detail pages, initiate purchases, or take any of the actions described in the above examples.

Figure 8:
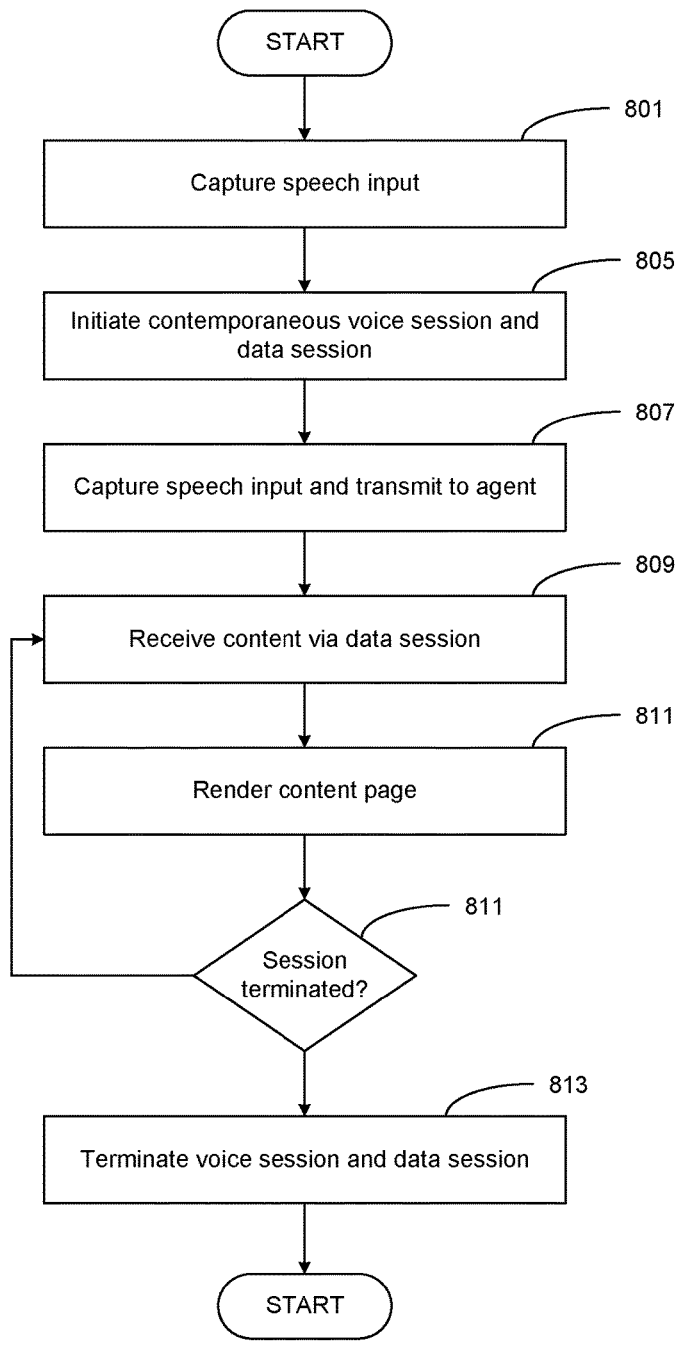
FIGS. 8-9 are flowcharts illustrating one examples of functionality implemented as portions of the assisted shopping application and assisted shopping agent application executed in a client device and a computing device, respectively, in the networked environment of FIG. 1 according to various embodiments of the present disclosure.

Referring next to FIG. 8, shown is a flowchart that provides one example of the operation of a portion of the assisted shopping application 155 executed on a client device according to various embodiments. It is understood that the flowchart of FIG. 8 provides merely an example of the many different types of functional arrangements that may be employed to implement the operation of the portion of the assisted shopping application 155 as described herein. As an alternative, the flowchart of FIG. 8 may be viewed as depicting an example of steps of a method implemented in a client device 106 (FIG. 1) according to one or more embodiments.

Beginning with box 801, the assisted shopping application 155 can capture a speech input from a user. As noted above, the assisted shopping application 155 can capture such an input via microphone that is integrated with the client device 106. In box 805, the assisted shopping application 155 can initiate contemporaneous voice and data sessions with the assisted shopping agent application 121. In box 807, the assisted shopping application 155 can capture speech input from the user and transmit the speech input to the assisted shopping agent application 121 and/or CS agent application 143 via the data session.

Figure 9:
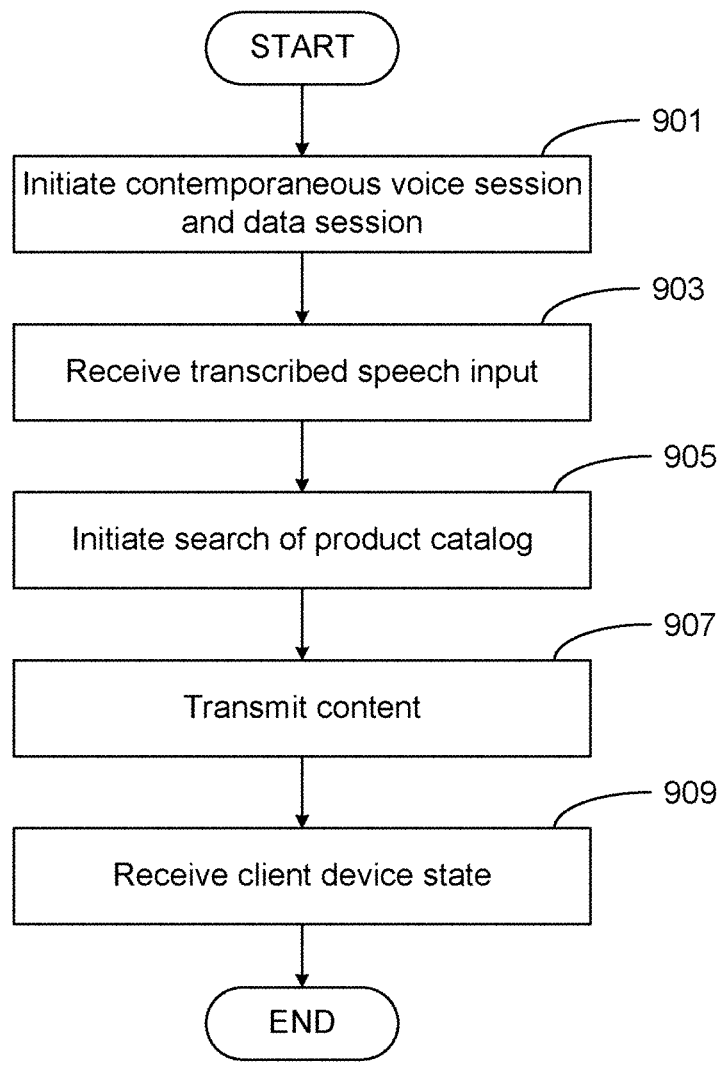

In box 809, the assisted shopping application 121 can receive content from the assisted shopping agent application 121 and/or CS agent application 143. The content can be received via the data session and can be one or more search results that are based upon the captured speech input. In box 811, the assisted shopping application 155 can render a content page containing at least a portion of the content received in box 809. In box 811, the assisted shopping application 155 can determine whether the assisted shopping session is terminated by the user and/or the CS agent. If so, then in box 813, the assisted shopping application 155 can terminate the data session as well as voice session. Referring next to FIG. 9, shown is a flowchart that provides one example of the operation of a portion of the assisted shopping agent application 121 according to various embodiments. It is understood that the flowchart of FIG. 9 provides merely an example of the many different types of functional arrangements that may be employed to implement the operation of the portion of the assisted shopping agent application 121 as described herein. As an alternative, the flowchart of FIG. 9 may be viewed as depicting an example of steps of a method implemented in a computing device 103 (FIG. 1) according to one or more embodiments.

In box 901, the assisted shopping agent application 121 can initiate contemporaneous voice and data sessions with the assisted shopping application 155 executed on a client device 106. In box 903, the assisted shopping agent application 121 can receive a transcribed speech input from the assisted shopping application 155. In box 905, the assisted shopping agent application 121 can initiate a search of a product catalog 137 for products that are relevant to the transcribed speech input. In box 907, the assisted shopping agent application 121 can transmit content to the assisted shopping application 155 for display on a client device 106. In box 909, the assisted shopping agent application 121 can receive data about the state of the client and/or the assisted shopping application 155. The assisted shopping agent application 121 can receive information about a proximity sensor state, a state of a display device, whether the device is in a sleep mode, etc., and provide this information to a CS agent to facilitate the assisted shopping experience. The assisted shopping agent application 121 can also receive inputs from a user, which can cause additional content requests from the assisted shopping application 155 that can be served by the assisted shopping agent application 121.

Figure 10:
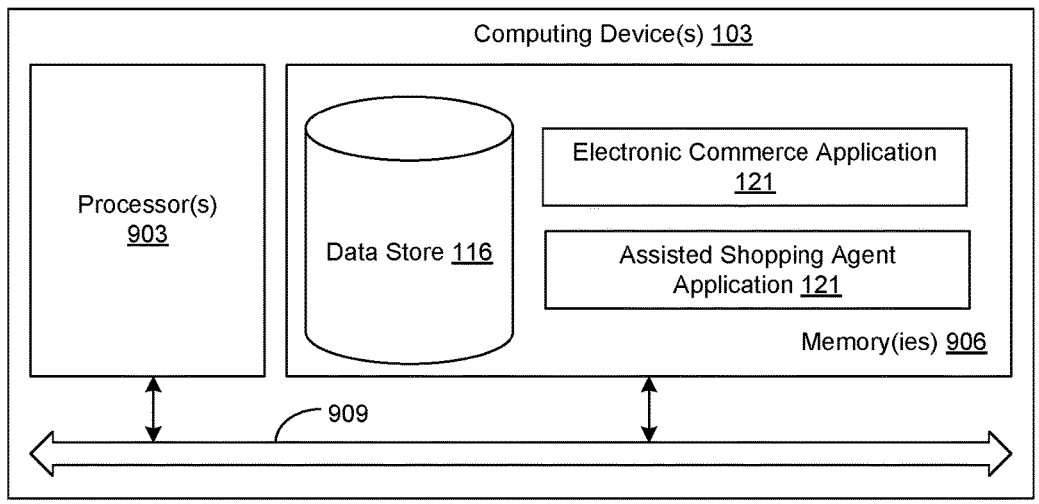
FIGS. 10-11 are schematic block diagrams that provide one example illustration of a computing device and client device, respectively, employed in the networked environment of FIG. 1 according to various embodiments of the present disclosure.
Figure 11:
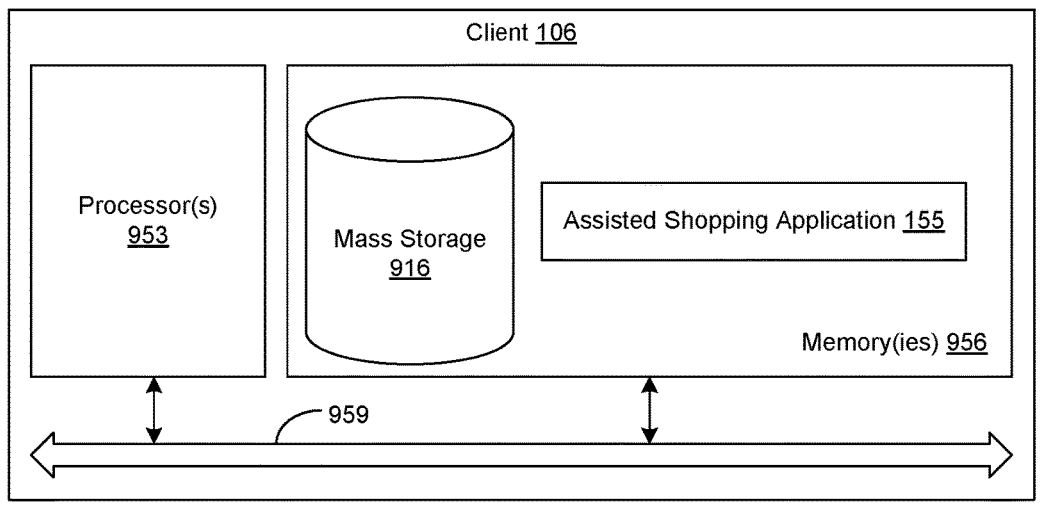

With reference to FIGS. 10-11, shown are schematic block diagrams of the computing device 103 and client device 106, respectively, according to embodiments of the present disclosure. The computing device 103 includes at least one processor circuit, for example, having a processor 903 and a memory 906, both of which are coupled to a local interface 909. To this end, the computing device 103 may comprise, for example, at least one server computer or like device. Similarly, the client device 106 includes at least one processor circuit, for example, having a processor 953 and a memory 956, both of which are coupled to a local interface 959. The local interfaces 909, 959 may comprise, for example, a data bus with an accompanying address/control bus or other bus structure as can be appreciated.

Stored in the memory 906, 956 are both data and several components that are executable by the processor 903, 953. In particular, stored in the memory 906, 956 and executable by the processor 903, 953 are the various application discussed herein. Also stored in the memory 906 may be a data store 116 and other data. The client device 106 can also include a mass storage 916 component for data storage. In addition, an operating system may be stored in the memory 906, 956 and executable by the processor 903, 953. In the case of the client device 106, the operating system can provided the ability such as various application programming interfaces, that allow the assisted shopping application 155 to interact with the various hardware components such as a proximity sensor, microphone, speaker, display, capacitive or resistive touchscreen, or other input or output devices.

It is understood that there may be other applications that are stored in the memory 906, 956 and are executable by the processors 903, 953 as can be appreciated. Where any component discussed herein is implemented in the form of software, any one of a number of programming languages may be employed such as, for example, C, C++, C#, Objective C, Java, JavaScript, Perl, PHP, Visual Basic, Python, Ruby, Delphi, Flash, or other programming languages.

A number of software components are stored in the memory 906, 956 and are executable by the processor 903, 953. In this respect, the term "executable" means a program file that is in a form that can ultimately be run by the processor 903, 953. Examples of executable programs may be, for example, a compiled program that can be translated into machine code in a format that can be loaded into a random access portion of the memory 906, 956 and run by the processor 903, 953, source code that may be expressed in proper format such as object code that is capable of being loaded into a random access portion of the memory 906, 956 and executed by the processor 903, 953, or source code that may be interpreted by another executable program to generate instructions in a random access portion of the memory 906, 956 to be executed by the processor 903, 953, etc. An executable program may be stored in any portion or component of the memory 906, 956 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 906, 956 is defined herein as including both volatile and nonvolatile memory and data storage components. Volatile components are those that do not retain data values upon loss of power. Nonvolatile components are those that retain data upon a loss of power. Thus, the memory 906, 956 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 903, 953 may represent multiple processors 903, 953 and the memory 906, 956 may represent multiple memories 906 that operate in parallel processing circuits, respectively. In such a case, the local interface 909, 959 may be an appropriate network 113 (FIG. 1) that facilitates communication between any two of the multiple processors 903, 953, between any processor 903, 953 and any of the memories 906, 956, or between any two of the memories 906, 956, etc. The local interface 909, 959 may comprise additional systems designed to coordinate this communication, including, for example, performing load balancing. The processor 903, 953 may be of electrical or of some other available construction.

Although the various applications and systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 8-9 show the functionality and operation of an implementation of portions of the assisted shopping application 155 and assisted shopping agent application 121. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 903 in a computer system or other system. The machine code may be converted from the source code, etc. If embodied in hardware, each block may represent a circuit or a number of interconnected circuits to implement the specified logical function(s).

Although the flowcharts of FIGS. 8-9 show a specific order of execution, it is understood that the order of execution may differ from that which is depicted. For example, the order of execution of two or more blocks may be scrambled relative to the order shown. Also, two or more blocks shown in succession in FIGS. 8-9 may be executed concurrently or with partial concurrence. Further, in some embodiments, one or more of the blocks shown in FIGS. 8-9 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the assisted shopping application 155 and/or assisted shopping agent application 121, that comprises software or code can be embodied in any non-transitory computer-readable medium for use by or in connection with an instruction execution system such as, for example, a processor 903, 953 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium having a computer-executable program stored thereon that, when executed by a computing device, configures the computing device to perform operations comprising:
   receiving an audio input from a client device;
   obtaining location information from a positioning system associated with the client device;
   generating a transcription of the audio input;
   performing a search query that is based at least upon the transcription of the audio input;
   initiating a bidirectional voice session with the client device, the bidirectional voice session enabling a first user of the client device to speak with a second user;
   rendering for display a user interface of content being shown on the client device;
   rendering for display, contemporaneously with maintaining the bidirectional voice session with the client device, a search results user interface that displays a plurality of items identified from the search query on the client device, the plurality of items being generated based at least in part on the transcription of the audio input;
   generating a refined search query that is based at least upon the plurality of items generated from the search query, the refined search query selected by the second user and obtained from the second user via a customer service agent user interface, the refined search query further being different from the search query; and controlling the client device to display at least one search result in an instance after a selection of the at least one search result by the second user via the customer service agent user interface, the at least one search result being generated based at least upon the refined search query and the location information.

2. The non-transitory computer-readable medium of claim 1, the operations further comprising receiving information associated with an operation mode of the client device, the operation mode comprising a sleep mode or an active mode.

3. The non-transitory computer-readable medium of claim 2, the operations further comprising:
generating at least one product detail page from the computing device for display on the client device in response to a selection of a product by the second user via the customer service agent user interface;
obtaining a visual representation of content rendered on a display of the client device; and
updating the customer service agent user interface with a proximity sensor state and the visual representation of content rendered on the display of the client device.

4. The non-transitory computer-readable medium of claim 1, the operations further comprising:
transmitting a purchasing command to the client device, the purchasing command causes a shopping application executed on the client device to execute a purchase of item.

5. A system comprising:
a client device; and
an application executable in the client device, the application configured to cause the client device to:
capture an audio input for a search query;
initiate a data session with a computing device associated with a user;
generate a transcription of the audio input;
initiate a bidirectional voice session with the computing device;
render for display, contemporaneously with maintaining the bidirectional voice session with the computing device, a user interface in a display, the user interface comprising a first plurality of search results that includes a plurality of items identified from the search query on the client device, the plurality of items being generated based at least upon the transcription of the audio input;
receive location information from a positioning system associated with the client device;
transmit the location information and the first plurality of search results to the computing device; and
in response to receiving a second plurality of search results from the computing device, update the user interface to include the second plurality of search results, the second plurality of search results are generated based at least upon a refined search query performed via a customer service agent user interface, the refined search query being based at least upon the plurality of items generated from the search query and the location information.

6. The system of claim 5, wherein the application further causes the client device to render in the user interface the transcription of the audio input.

7. The system of claim 5, wherein the bidirectional voice session is initiated in response to rendering on the user interface the transcription of the audio input.

8. The system of claim 5, wherein the audio input comprises a product, and wherein the application further causes the client device to receive a page describing the product that is transmitted from the computing device in response to selection of an item by the user via the customer service agent user interface.

9. The system of claim 8, wherein the audio input comprises a first input, and wherein the application further causes the client device to:
receive a second input via the user interface corresponding to a purchase confirmation of the product rendered on the display; and
transmit the purchase confirmation to the computing device.

10. The system of claim 5, wherein the application further causes the client device to:
capture at least one of an image or a video with a capture device in communication with the client device; and
transmit the at least one of the image and the video to the computing device via the data session.

11. The system of claim 5, wherein the application further causes the client device to activate a speaker mode that comprises a speaker level setting and a microphone sensitivity setting.

12. A computer-implemented method comprising:
receiving, via at least one computing device over a network, an audio input from a client device;
generating, via the at least one computing device, a transcription based at least upon the audio input;
performing, via the at least one computing device, a search query based at least upon the transcription of the audio input;
initiating, via the at least one computing device, a bidirectional voice session with the client device;
rendering for display, via the at least one computing device and contemporaneously with maintaining the bidirectional voice session with the client device, a search results user interface that displays a plurality of items identified from the search query on the client device, the plurality of items being generated based at least in part on the transcription of the audio input;
identifying, via the at least one computing device, a refined search query that is based at least upon the plurality of items generated from the search query, the refined search query being different from the search query and being selected by a user via a customer service agent user interface in response to receiving the transcription of the audio input; and
transmitting, from the at least one computing device to the client device over the network, at least one search result in response to a selection of the at least one search result by the user via the customer service agent user interface, the at least one search result being generated based at least upon the refined search query, wherein transmitting the at least one search result to the client device causes the at least one search result to be rendered on a display of the client device.

13. The method of claim 12, wherein the user comprises a customer service agent, and further comprising initiating, via the at least one computing device, the bidirectional voice session between the customer service agent and the client device in response to rendering for display the transcription of the audio input on the client device.

14. The method of claim 13, further comprising initiating, via the at least one computing device, a data session with the client device, the bidirectional voice session operating contemporaneously with the data session.

15. The method of claim 12, further comprising receiving, via the at least one computing device, information associated with a state of a display device associated with the client device.

16. The method of claim 12, further comprising:
generating, via the at least one computing device, a product recommendation based at least upon a purchase history and a browse history associated with a user account of the client device; and
transmitting, via the at least one computing device, the product recommendation to the client device in response to selection of the product recommendation by the user via the customer service agent user interface.

17. The method of claim 12, wherein generating the transcription further comprises performing a speech recognition algorithm on the audio input, the speech recognition algorithm configured to convert the audio input to text.

18. The method of claim 12, further comprising:
transmitting, via the at least one computing device, at least one product detail page from the at least one computing device to the client device in response to a selection of a product by the user via the customer service agent user interface; and
receiving, via the at least one computing device, a visual representation of content rendered on a display of the client device.

19. The method of claim 12, wherein performing the search query further comprises executing a query of a product catalog associated with an electronic commerce site.

20. The method of claim 12, wherein generating the transcription of the audio input further comprises removing at least one term from the transcription based at least upon an identification of the at least one term having a plurality of search results that exceed a threshold.

* * * * *